(12) United States Patent
Lansinger

(10) Patent No.: US 6,357,980 B1
(45) Date of Patent: Mar. 19, 2002

(54) NUT CLIP ASSEMBLY FORMING A COPLANAR SURFACE

(75) Inventor: Jere R Lansinger, Bloomfield Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/685,624

(22) Filed: Oct. 10, 2000

(51) Int. Cl.[7] .................................................. F16B 37/04
(52) U.S. Cl. ........................................ 411/174; 411/171
(58) Field of Search ................................ 411/174, 175, 411/111, 112, 171

(56) References Cited

U.S. PATENT DOCUMENTS

| | | | |
|---|---|---|---|
| 2,087,113 A | * | 7/1937 | Owen |
| 2,159,573 A | | 5/1939 | Tinnerman |
| 2,516,274 A | | 7/1950 | Tinnerman |
| 2,861,618 A | | 11/1958 | Tinnerman |
| 3,009,499 A | | 11/1961 | Weihe |
| 3,283,794 A | | 11/1966 | Steward et al. |
| 3,496,980 A | | 2/1970 | Steward et al. |
| 4,375,933 A | | 3/1983 | Hassler et al. |
| 4,676,706 A | * | 6/1987 | Inaba .......................... 411/175 |
| 4,919,394 A | * | 4/1990 | Otte ............................ 411/174 |
| 4,955,772 A | * | 9/1990 | Reck ........................... 411/175 |
| 5,273,384 A | | 12/1993 | Dunbar |
| 5,423,646 A | | 6/1995 | Gagnon |
| 5,934,851 A | * | 8/1999 | Stewart ....................... 411/174 |

\* cited by examiner

Primary Examiner—Flemming Saether
(74) Attorney, Agent, or Firm—Mark P. Calcaterra

(57) ABSTRACT

A nut/clip assembly has a nut and a clip. The nut has an internally threaded cylindrical portion of sufficient wall thickness that the internal threads are fully-formed. The cylindrical portion of the nut is formed by extrusion. The clip is U-shaped and has spaced apart legs. One leg of the clip is rigidly secured to the cylindrical portion of the nut by welding. The other leg of the clip extends across the cylindrical portion of the nut and has a bolt-receiving hole aligned with the internal threads. The cylindrical portion of the nut is of greater thickness than the clip. The clip is made of a carbon steel alloy and the nut is made of a carbon steel alloy of lesser carbon content than the clip.

11 Claims, 1 Drawing Sheet

NUT CLIP ASSEMBLY FORMING A COPLANAR SURFACE

This invention relates generally to fastening devices and more particularly to a device having a clip for attachment to a panel and a nut for receiving a threaded bolt.

BACKGROUND OF THE INVENTION

There are many instances, especially in blind locations, where a nut is desired, but where the operator either cannot hold the nut in place while the bolt is being inserted, or cannot thereafter hold the nut against rotation during the final tightening operation. At the present time, nut clips are widely used in the automotive industry for fastening sheet metal panels. Typically, a U-shaped sheet metal clip is provided, with one leg of the clip formed by extrusion to provide a nut which is subsequently tapped or roll-formed to provide internal threads. The problem with these nut clips is that the threads are often of poor quality and not well formed, as a result of which the bolt is prone to cross-threading and stripping. Poor quality threads are due in part to the hardness of the metal of which the sheet metal clip is formed and also to the thinness of the clip metal. The process of extruding the nut further thins the metal. Also the thin high carbon steel does not draw well so that there is a relatively large radius where the nut joins the clip. As a result, the threads in the radiused portion of the nut are even less well formed.

To avoid the foregoing difficulties, a separate cold-headed nut is sometimes attached to a conventional U-shaped clip, but this is an expensive expedient which has to be ruled out for many applications.

SUMMARY OF THE INVENTION

In accordance with the present invention, a nut/clip assembly is provided in which the clip is much like the clips of prior nut/clip assemblies, but the nut portion is made of a different and thicker material than the spring clip portion, giving the nut portion a greater wall thickness. The nut is formed preferably by extruding or drawing a nut blank. The nut is internally threaded, and because the nut is of sufficient wall thickness, the threads are fully formed and of good quality. The nut is secured to one of the legs of the clip preferably by welding. The other leg of the clip extends across the nut and has a bolt-receiving hole aligned with the nut threads.

Preferably, the clip is made of a carbon steel alloy and the nut is made of a carbon steel alloy of lesser carbon content than the clip. In a preferred embodiment, the clip is made of a relatively hard 1045 carbon steel and the nut is made of a softer 1010 carbon steel. The clip is sufficiently resilient to grip a panel. The softer metal of the nut contributes to the formation of high quality threads. Also, the softer nut metal draws well and the radius where the nut joins the clip is quite small so that even the nut threads in this radiused portion are of good quality.

One object of this invention is to provide a nut/clip assembly having the foregoing features and capabilities.

Another object is provide a nut/clip assembly which is strong and durable in use, which has high quality fully formed threads, and which can be easily and inexpensively manufactured.

These and other objects, features and advantages of the invention will become more apparent as the following description proceeds, especially when considered with the accompanying claims and drawings.

DETAILED DESCRIPTION OF THE PREFERRED EMBODIMENT

Figure 1:
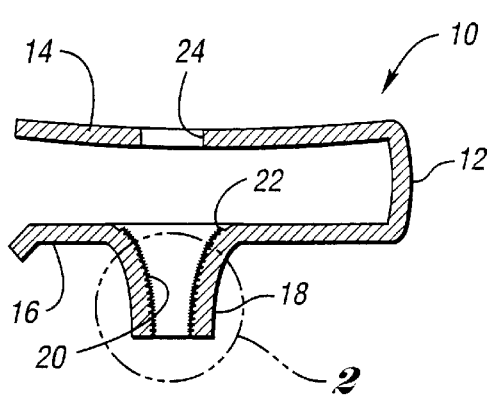
FIG. 1 is a sectional view of a prior art nut/clip assembly.
Figure 2:
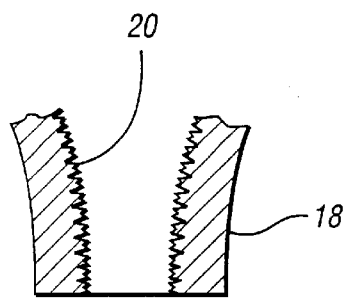
FIG. 2 is an enlarged sectional view showing the threads of the nut in FIG. 1.

Referring now more particularly to the drawings, there is shown in FIG. 1 a prior art nut/clip assembly 10 including a clip 12 of U-shape having spaced apart legs 14 and 16. The clip is made of a relatively hard carbon steel and is resilient and springy so that it can clamp on to a panel placed between the clip legs. A nut 18 is formed by extruding or drawing an apertured portion of the leg 16. Internal threads 20 are formed in the nut by tapping or roll-forming. The threads as seen in FIG. 2 are not completely formed and are of poor quality due to the hardness and thinness of the metal clip. The metal is further thinned by the drawing of the metal to form the nut. Because of its hardness, the clip metal does not draw well and therefore there is a relatively large radius at the base 22 of the nut where it joins the leg of the clip. The threads are particularly bad at the base 22 because of this large radius. The leg 14 of the nut extends across the nut and is formed with a bolt-receiving aperture 24 so that a bolt can be threaded into the nut.

Figure 3:
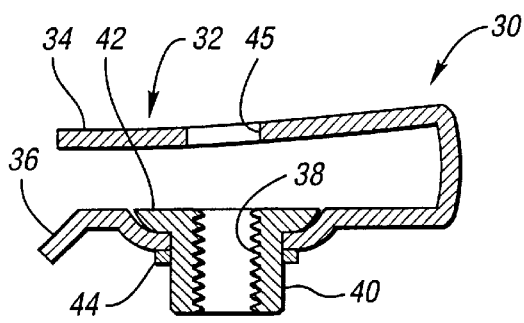
FIG. 3 is a sectional view of a second prior art construction.

FIG. 3 shows another prior art nut/clip assembly 30 in which the clip 32 is of substantially the same configuration as in FIG. 1, being of U-shape with spaced apart legs 34 and 36. The clip may be made of the same relatively hard carbon steel as the clip in FIG. 1. The leg 36 of the clip has a hole 38 for receiving a separate cold-headed nut 40. The nut 40 has a flange 42 extending over the inner surface of the leg 36 around the hole 38. The nut is secured in the hole 38 by staking the metal of the nut against the outer surface of the leg 36 where indicated at 44. The leg 34 has a bolt-receiving aperture 45. In this nut/clip assembly, the nut threads are well formed, but because the assembly requires a separate, cold-headed nut, the entire assembly is too expensive for many applications.

Figure 4:
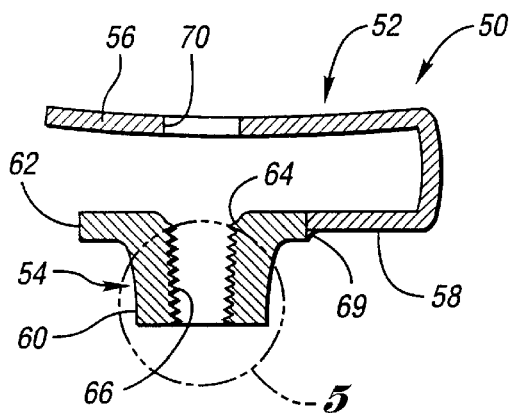
FIG. 4 is a sectional view of a nut/clip assembly constructed in accordance with the present invention.
Figure 5:
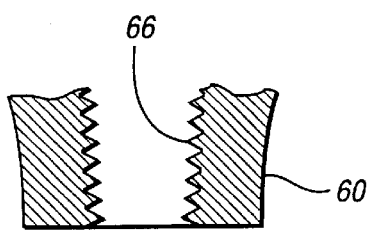
FIG. 5 is an enlarged sectional view showing the threads of the nut in FIG. 4.

FIG. 4 shows the nut/clip assembly 50 of this invention which includes a clip 52 and a nut 54. The clip 52 may be made of the same relatively hard carbon steel as the nut in the prior art embodiments shown in FIGS. 1–3 and has spaced apart legs 56 and 58, the leg 58 being much shorter than the leg 56. The nut 54 is formed from a nut blank by extruding or drawing an apertured center portion of a nut blank to the configuration shown in FIG. 4 to form a tubular cylindrical central portion 60 with a surrounding rim 62 at the base 64 of the cylindrical portion. The cylindrical portion 60 of the nut is internally threaded as by tapping or roll-forming to produce the nut threads 66. The wall of the cylindrical portion 60 of the nut is sufficiently thick that the threads 66 are perfectly formed and of high quality.

The clip 52 is relatively thin and made of a carbon steel alloy in which the amount of carbon is about 0.45% by weight of the alloy. Preferably the steel alloy is a 1045 carbon steel. As pointed out above in connection with the prior art embodiments, a clip made of this metal hardness is springy enough to clip on to and resiliently hold a panel placed between the leg 56 of the clip and the rim 62 of the nut. The nut 54 is thicker than the clip 52 and is made of a softer steel alloy in which the amount of carbon is about 0.10% by weight of the alloy. Preferably the steel alloy is a 1010 carbon steel with enough wall thickness in the cylindrical portion 60 to enable the threads 66 to be fully formed. The softer and thicker metal of the nut also contributes to the good quality of the threads 66. It will be noted that the threads even at the base 64 of the cylindrical portion of the nut where it joins the rim 62, are well formed because the radius at this point is much smaller than in the prior art construction of FIG. 1. The relatively soft nut metal permits a high draw quality and can be extruded or drawn to a much smaller radius at the base 64 of the extrusion.

The short leg 58 of the clip is welded along the line 69 to the rim 62 of the nut to form a substantially common planar surface as shown in FIG. 4 and the longer leg 56 extends across the nut and is formed with a bolt-receiving aperture 70 to permit a bolt to be threaded into the nut.

Figure 6:
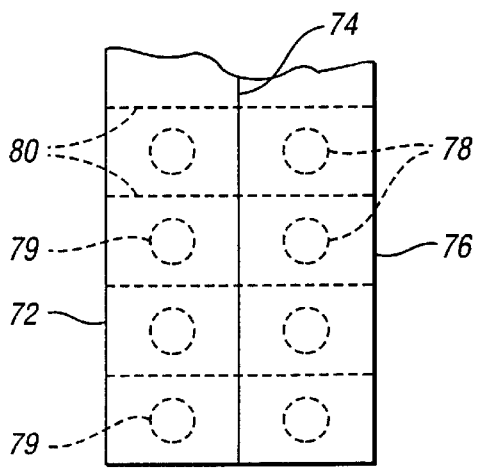
FIG. 6 is a fragmentary elevational view showing a clip blank welded to a nut blank, from which nut/clip assemblies of this invention can be made.

FIG. 6 shows an elongated strip of metal 72 from which the clips of FIG. 4 are formed, joined by welding along a weld line 74 to an elongated strip of metal 76 from which the nut blanks are formed. The metal strip 76 is apertured at spaced points 78 where the nuts are extruded. The strip 72 is apertured at spaced points 79. The broken lines 80 indicate where the welded together strips 72 and 76 are severed to separate the nut clip assemblies 50.

What is claimed is:

1. A nut/clip assembly comprising:
   a nut including a tubular, cylindrical portion having fully formed internal threads,
   said cylindrical portion of said nut being of sufficient wall thickness to enable said internal threads to be fully formed; and
   a U-shaped clip having spaced apart first and second legs,
   said first leg of said clip being rigidly secured to an outer edge of said cylindrical portion of said nut to form a substantially common planar surface,
   said second leg of said clip extending across said one end of said cylindrical portion of said nut and having a bolt-receiving hole aligned with said internal threads,
   said clip being sufficiently resilient to grip a panel between said second leg of said clip and said one end of the cylindrical portion of said nut.

2. A nut/clip assembly as defined in claim 1, wherein the cylindrical portion of said nut is of greater thickness than said clip.

3. A nut/clip assembly as defined in claim 1, wherein the cylindrical portion of said nut is an extrusion formed in an apertured portion of a nut blank.

4. A nut/clip assembly as defined in claim 1, wherein said nut has a rim at said one end thereof to which said first leg of said clip is secured by welding.

5. A nut/clip assembly as defined in claim 1, wherein the clip is made of a carbon steel alloy having a carbon content of about 0.45% by weight of the alloy.

6. A nut/clip assembly as defined in claim 1, wherein the nut is made of a carbon steel alloy having a carbon content of about 0.10% by weight of the alloy.

7. A nut/clip assembly as defined in claim 1, wherein the clip is made of a carbon steel alloy and said nut is made of a carbon steel alloy of lesser carbon content than said clip.

8. A nut/clip assembly as defined in claim 1, wherein said clip is made of 1045 carbon steel and said nut is made of 1010 carbon steel.

9. A nut/clip assembly comprising:
   a nut including a tubular, cylindrical portion having fully formed internal threads,
   said cylindrical portion of said nut being of sufficient wall thickness to enable said internal threads to be fully-formed,
   the cylindrical portion of said nut being an extrusion formed in an apertured portion of a nut blank leaving a rim defining one end of said cylindrical portion,
   a U-shaped clip having spaced apart first and second legs,
   said first leg of said clip being rigidly secured to the rim at said one end of said cylindrical portion of said nut by welding to form a substantially common planar surface,
   said second leg of said clip extending across said one end of said cylindrical portion of said nut and having a bolt-receiving hole aligned with said internal threads,
   said clip being sufficiently resilient to grip a panel between said second leg of said clip and said one end of the cylindrical portion of said nut,
   the cylindrical portion of said nut is of greater thickness than said clip, said clip being made of a carbon steel alloy and said nut being made of a carbon steel alloy of lesser carbon content than said clip.

10. A nut/clip assembly as defined in claim 9, wherein said clip is made of 1045 carbon steel and said nut is made of 1010 carbon steel.

11. A nut/clip assembly comprising:
    a nut including a tubular, cylindrical portion having fully formed internal threads, said cylindrical portion of said nut being of sufficient wall thickness to enable said internal threads to be fully-formed, the cylindrical portion of said nut being an extrusion formed in an apertured portion of a nut blank leaving a rim defining one end of said cylindrical portion, and
    a U-shaped clip having spaced apart first and second legs, an end portion of said first leg of said clip being rigidly secured to the rim of said cylindrical portion of said nut by welding to form a substantially common planar surface, said second leg of said clip extending across said one end of said cylindrical portion of said nut and having a bolt-receiving hole aligned with said internal threads, said clip being sufficiently resilient to grip a panel between said second leg of said clip and said one end of the cylindrical portion of said nut, wherein the cylindrical portion of said nut is of greater thickness than said clip, said clip being made of a carbon steel alloy and said nut being made of a carbon steel alloy of lesser carbon content than said clip.

* * * * *